March 16, 1954
A. T. COAKLEY
2,672,325
PROCESS FOR COMBINING FINELY DIVIDED
SOLID MATERIAL WITH LIQUID
Original Filed Sept. 7, 1949
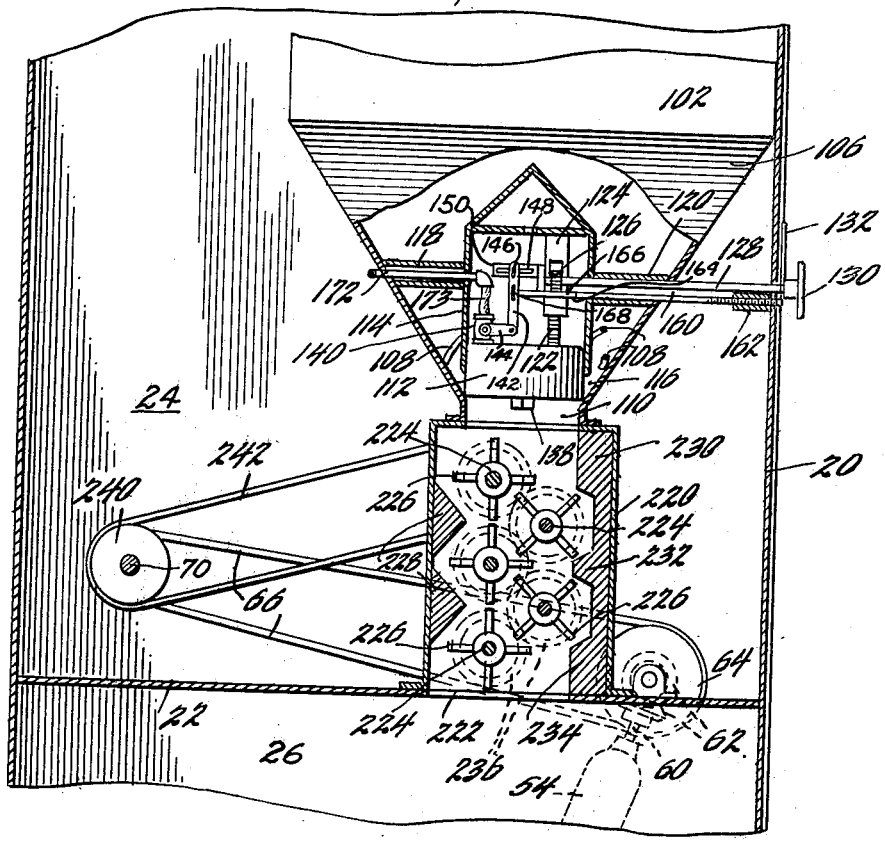
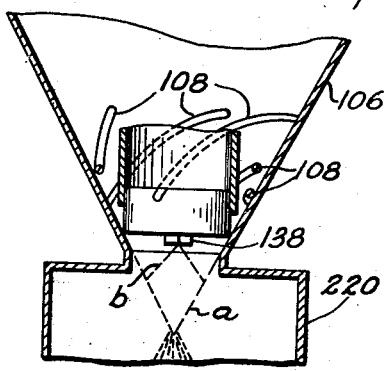
INVENTOR.
Arthur T. Coakley
BY
ATTORNEYS Patented Mar. 16, 1954

2,672,325

UNITED STATES PATENT OFFICE 2,672,325

PROCESS FOR COMBINING FINELY DIVIDED SOLID MATERIAL WITH LIQUID

Arthur Timothy Coakley, Catonsville, Md.

Original application September 7, 1949, Serial No. 114,358, now Patent No. 2,586,613, dated February 19, 1952. Divided and this application February 11, 1952, Serial No. 270,947

8 Claims. (Cl. 259—6)

The present invention relates to a process for combining or uniting various dry granular, powdery, pulverulent or other finely divided fluent solid materials with liquids, or oils, fatty or similar substances which have been reduced to a sufficiently fluent or liquid state by melting or other method of liquefaction, the present application being a division of my prior application Serial No. 114,358, filed September 7, 1949, now Patent No. 2,586,613, granted February 19, 1952.

One of the primary objects of the invention is to provide a novel process for combining or uniting and rubbing together hydrogenated vegetable oils and essential oils, such as oil of orange or lemon, with finely granulated sugar, and blending the resulting mass with other dry ingredients in one continuous operation in which the proportions of the ingredients are controlled. The invention is applicable, for example, to the preparation of dry formulae bases for cake, biscuit, cruller, waffle and doughnut mixes and the like. In the preparation of such bases, it is necessary to mix together such ingredients as wheat flour, soy flour, sugar, shortening, egg yolk, egg white, lecithin, skim milk, whole milk, buttermilk, baking acids, bicarbonate of soda, salt, spices, liquid flavors and other materials.

Shortening and sugar can be combined and rubbed or creamed to desired degrees of consistency varying from a fluffy snow-like mass to a heavy emulsion, dependent upon the proportion of liquid shortening to dry granulated or pulverulent sugar used and upon the duration of the rubbing operation, by placing a batch of such ingredients in a mixing chamber and turning the mass by means of rotating arms or blades.

The present invention provides a process whereby the combining and rubbing together of such materials can be performed more rapidly and economically by first impregnating the sugar with the liquefied shortening and then rubbing therewith.

The sugar is impregnated with the liquefied shortening while the sugar is flowing and preferably spinning in the form of a hollow inverted cone, and the shortening is sprayed in the form of a hollow cone directly upon the inner surface of the hollow cone of flowing sugar, the shortening and sugar being brought together in controlled proportion. The impregnated mass of sugar and shortening is then rubbed by passing the mass continuously through a chamber containing a series of bladed elements which are rotated alternately in opposite directions throughout the series and operate frictionally upon the mass. When the shortening-impregnated and rubbed sugar is to be employed in the preparation of bakery and similar products, it is discharged continuously into a dry materials blender which incorporates the shortening-impregnated and rubbed sugar with the dry ingredients such as are used in the preparation of such products.

The invention, however, is applicable more generally to the impregnating and rubbing together of various other liquids or liquefied substances and granular, pulverulent or other fluent solid materials, either edible or inedible, such for example as the combining or compounding of face powder, tooth powder or body powder with scenting or flavoring oils; feeds, meals or laying mash; or the incorporation of fish oils or vitamin agents with food products; and other desired combinations, the invention being applicable to the impregnating or saturating and rubbing of various dry granular, pulverulent or finely divided and fluent solid materials with any liquid or mixture of liquids, and/or oily or fatty substances in a liquid state while the solid materials and liquid substances are flowing at rates which are regulated relatively to one another whereby they will be combined or united in direct desired proportion.

The present invention also provides a process wherein the impregnating and rubbing of sugar or other fluent solid material with shortening or other liquid or liquefied substance or substances may be performed while the solid material and liquid or liquefied substance are flowing continuously and in predetermined regulated proportion, and the blending of the resulting impregnated and rubbed product with mixes such as used in bakeries and similar establishments, may be performed in a single and complete operation.

The invention may be carried out advantageously with the aid of apparatus substantially of the preferred form shown in the accompanying drawings, wherein—

Figure 1 is a vertical section of the impregnating and rubbing elements of the apparatus.

Figure 2 is a diagrammatic view illustrating the manner in which the liquid is sprayed in the form of a hollow cone against the solid material while the latter is advancing in the form of a hollow inverted cone.

Similar parts are designated by the same reference numerals in the two figures.

Referring more particularly to the accompanying drawings, 20 designates generally a casing, preferably of substantially rectangular form, which encloses the various elements of the apparatus, the casing being composed of sheet metal or other suitable material. The casing is divided interiorly by a horizontal partition 22 into upper and lower compartments 24 and 26 respectively, the lower compartment being adapted to contain a batch blender preferably of the construction shown and described in my aforesaid patent, and from which the blended materials may be discharged by a screw conveyor 54 the shaft 60 of which may be driven through gearing 62 from a pulley 64, this pulley being driven through a belt 66 from a shaft 70 and suitable control means as shown and described in my aforesaid patent.

A hopper 102 is provided to supply the sugar or other granular, pulverulent or other fluent solid material to be impregnated with the shortening or other liquid or liquefied substance, this hopper being open at the top through which the sugar or solid material may be introduced into this hopper. The lower section 106 of the hopper 102 is in the form of an inverted cone and its inner surface is provided preferably with a suitable number of spiral ribs or flanges 108 to impart a spinning motion to the material descending by gravity within this conical section. The lower extremity of the conical section 106 is provided with a circular discharge opening 110 which is concentric with the axis of the conical section 106, and this opening is controlled by a valve, which is preferably in the form of a cylindrical gate valve or piston 112 which is somewhat larger than the opening 110 and is mounted to slide vertically in a cylindrical housing 114 in alinement with the discharge opening 110 and to cooperate with the conical inner surface of the section 106 adjacent to and surrounding said opening as a valve seat. The housing 114 is suitably supported in fixed position with its lower edge spaced above the lower portion of the wall of the conical section 106 to provide an annular passage 116 through which the solid material descending over the inner surface of said conical section may pass to the discharge opening 110 under control of the valve 112. The housing 114 is shown rigidly supported in the position described by tubular supporting members 118 and 120 which are welded or otherwise fixed to the housing and to the conical section of the hopper. As the sugar or solid material descends by gravity in the conical section 106, a spinning motion is imparted thereto by the spiral ribs 108, and as said material discharges downwardly through the circular opening 110 it is formed into a hollow inverted cone, as indicated diagrammatically in Fig. 15.

The valve 112 is raised and lowered to vary the area of the discharge passage 116 by suitable means, such means as shown in the present instance comprising a rack bar 122 which is welded or otherwise fixed to the top of the valve and guided by a guideway 124 which is fixed to the upper portion of the housing 114, and by a pinion 126 which meshes with the rack bar and is fixed to the inner end of a shaft 128, this shaft extending outwardly through the housing and conical section of the hopper and through the wall of the outer casing to the exterior thereof where it is provided with a hand wheel 130 for rotating it. The shaft 128 carries a pointer 132 which may cooperate with a scale or dial to indicate different rates of flow of the sugar or other dry solid material through the discharge passage 116 and thereby facilitate the setting of the control valve 112.

The shortening or other liquid or liquefied substance to be used for impregnating the sugar or other solid material is sprayed against the inner side of the hollow inverted cone $a$ of the sugar or solid material in the form of hollow cone $b$ of the liquid which is coaxial with the hollow inverted cone $a$, as indicated diagrammatically in Fig. 15, by a spray nozzle 138 which is fixed centrally in the lower end of the valve 112 to discharge the spray of liquid downwardly and axially through the circular opening 110, this nozzle being of any well known type capable of atomizing and spraying liquid in the form of a hollow cone. This nozzle is supplied with the liquid or liquefied substance through a control valve 140 which is fixed to the control valve 112 for the solid material so that it will move upwardly and downwardly therewith during its adjustments, and is connected to the spray nozzle 138 by a suitable conduit.

The extent of opening of the liquid control valve 140 is regulated synchronously and in correlation with the extent of opening of the solid material control valve 112 by suitable means. The means shown in the present instance for effecting such synchronous and correlative regulation of these valves comprises a link 142 pivotally connected at its lower end to an arm 144 which effects the opening and closing of the valve 140, and is provided at its upper end with a pin 146 which engages in and is adjustable along a slot 148 in a relatively fixed or stationary extension 150 of the fixed guideway 124. The liquid control valve 140 is shown in the form of a plug valve comprising an outer casing and a plug which is rotatable in the casing and connected to the operating arm 144, the plug and casing having controlling ports as shown and described in my aforesaid patent.

The ports of the valve 140 are so arranged and the controlling link 142 and arm 144 for the valve 140 are preferably so designed and proportioned that while the solids material control valve 112 is fully closed, as shown in Fig. 1, the liquid control valve 140 will be in the fully closed position, and as the valve 112 is elevated to open it for the flow of the solid material, the plug of the valve 140 will be rotated into a position to open this valve, more or less, depending upon the extent of opening of the valve 112, or to rotate the plug of the valve 140 into its fully open position, which it assumes when the valve 112 is fully open.

The synchronous control thus provided between the solid material control valve 112 and the liquid control valve 140 proportions the rates of flow of the solid material and liquid and consequently the proportions of said material and liquid brought together and maintains such proportions for different extents of opening of these valves for a given setting of their intercontrolling connections, but these connections are adjustable to vary the proportioning of flow of the solid material and liquid as may be desired, such adjustment being provided by the slot 148 in the guideway extension 150 in which the pin 146 on the upper end of the link 142 is adjustable. Shifting of the link 142 angularly from its vertical position will shift the pin 146 on its upper end from the center toward an end of the slot 148, which will have the effect of reducing the extent of opening of the valve 140 for a given extent of opening of the valve 112 and of thereby reducing the proportion of liquid supplied relatively to solid material. Such adjustment of the link 142 may be effected from the exterior of the outer casing by a rod 160 the outer end of which is exposed at the exterior of the casing and slotted or otherwise formed for adjustment by a screw driver or other suitable tool, and the outer portion of this rod is threaded in a sleeve 162 fixed to the inner side of the adjacent wall of the casing whereby rotation of this rod will move it endwise. The inner end of the rod 160 is connected by a swivel joint 164 to a rod 166 to which endwise movement of the rod 160 is communicated, the inner end of the rod 166 being connected at 168 to the link 142 and operable by the endwise movements thereof to adjust the angular position of said link. Accordingly, rotation of the rod 160 in one direction will shift the pin 145 in a direction from the center toward an end of the slot 148 to reduce the rate of supply of liquid, and rotation of said rod in the opposite direction will move said pin toward the center of said slot and thereby relatively increase the rate of flow of liquid.

The liquid is supplied to the valve 140 at a suitable constant pressure through a pipe 172, which preferably extends through the hollow supporting tube 118 and is connected to said valve by a flexible tube 173. When shortening, fatty or similar materials are to be employed for impregnating sugar or other solid material, the shortening or similar substance is heated and thereby liquefied.

The hollow inverted cone of sugar or other solid material and the hollow cone of liquid or liquified substance are projected through the opening 110 into a rubbing chamber wherein thorough combining of the solid material and liquid takes place. The rubbing chamber comprises a casing 220 the upper end of which is fixed to the lower end of the conical section 106 of the solid material supply hopper and is open to receive the inverted cone of impregnated material therefrom, and the lower end of the casing 220 is fixed to the partition 22 which is provided with an opening 222 above the blender for the discharge of the rubbed mass into the blender. The rubbing chamber has a suitable number of rubbing elements mounted to rotate therein, these rubbing elements comprising preferably rotatable shafts 224 journaled in the opposite ends of the casing and provided with blades 226 which project radially therefrom and extend axially thereof, these blades being solid or imperforate. It is preferable to employ a series of at least five of these rubbing elements each provided with four blades, and to arrange the rubbing elements in tiers in two parallel adjacent rows, three of these elements being shown in the present instance arranged in one row with their axes in a common vertical plane and two of these elements being arranged in an adjacent row with their axes in a common vertical plane and at levels respectively between the level of the axis of the middle element and the levels of the axes of the upper and lower elements of the three-tier row.

The casing 220 is provided at the inner side of one of its walls with deflectors 228 which extend inwardly between the circular paths of travel of the peripheries of the blades of the middle and upper and lower rubbing elements of the three-tier row of elements, respectively and have reversely inclined guiding surfaces, and said casing is provided at the inner side of its opposite wall with deflectors 230, 232 and 234 providing a pair of recesses with bevelled surfaces in which the rubbing elements of the two-tier row operate, and which latter deflectors are staggered relatively to the deflectors 228, thus forming a sinuous or tortuous channel for the passage of the material through the rubbing chamber, and in which channel the rubbing elements operate with minimum clearance. Means is provided for rotating the rubbing elements synchronously and alternately in relatively opposite directions in succession from the uppermost to the lowermost and from one tier to the other tier of the rubbing elements, such means as shown in the present instance comprising a train of intermeshing gears 236 fixed to the shafts of the rubbing elements and arranged to rotate the rubbing elements in the left hand tier in Fig. 1 in a clockwise direction and the rubbing elements in the right hand tier in said figure in the anti-clockwise direction. The blades of these elements in one tier during rotation thereof move synchronously into and out of the spaces between the blades of the rubbing elements in the adjacent tier, thereby producing a frictional or rubbing action on the mass of liquid impregnated solid material to effect a thorough combining or compounding action thereon, and to feed the mass of material downwardly through the sinuous or tortuous channel and discharge it into the blender to be mixed therein with dry solid materials to be contained as ingredients in the final product.

The gear train 236 is driven by a pulley on the shaft of one of the rubbing elements, a pulley 240 on the shaft 70 and a belt 242 connecting these pulleys. These pulleys are preferably changeable with pulleys of different relative ratios of diameters, or may be of the well known variable diameter type to enable the speed of the rubbing elements to be varied appropriately for the treatment of materials of different physical properties or to obtain products of different consistencies.

The various elements of the apparatus are preferably controlled from the exterior of the enclosing casing. The rate of feed of the solid material to be sprayed with the liquid is controlled by the hand wheel 130 and the proportion of liquid to solid material is adjustable by the exteriorly exposed slotted end of the rod 160, as previously stated.

In carrying out the process with the aid of an apparatus as hereinbefore described, the sugar or other granular or pulverulent solid material to be impregnated is placed in the supply hopper 102, the impregnating liquid, if an oily or fatty substance requiring liquefaction, is melted by heating until it has the desired consistency and the liquefied substance is fed at a constant pressure through the pipe 172 to the control valve 140, and the elements of the rubbing chamber are set into operation.

While the apparatus is in operation and supplied with granulated, pulverulent or other fluent solid material and liquid for impregnating it, as hereinbefore described, the valve 112 is opened to the appropriate extent according to the desired rate of feed of solid material by rotating the hand wheel 130 and, simultaneously therewith, the liquid control valve 140 is opened in consequence of the upward or opening movement of the valve 112 and the connection of the operating arm 144 of the valve 140 to the link 142, whereby the solid material will flow downwardly along the convergent inverted conical inner surface of the conical section 106 of the hopper 102, and in doing so will have a spinning or whirling motion imparted thereto by the spiral ribs 108. The granular or pulverulent solid material discharging by gravity through the circular opening 110 is formed into a spinning hollow inverted cone, and simultaneously the impregnating liquid supplied at a constant pressure to the nozzle 136 will be sprayed thereby in the form of a hollow cone inside of the hollow inverted spinning cone of granular or pulverulent solid material and against the inside of the descending hollow cone of solid material, thereby uniformly and thoroughly impregnating the solid material with the liquid, the spinning of the cone of solid material acting to fold the liquid into the dry solid material.

The liquid impregnated granulated or pulverulent solid material is discharged through the circular opening 110 into the rubbing chamber 220 in which it accumulates and is formed into a mass which substantially fills this chamber. This mass descends through the sinuous channel provided in this chamber and while doing so is successively rubbed frictionally by the interaction of the blades of the series of rubbing elements, thereby uniting or combining the liquid and granulated or pulverulent solid material uniformly throughout the mass.

The united or combined mass is discharged from the rubbing chamber through the discharge opening 222 into the blender where it is mixed with the other ingredients of the desired product which is discharged by the conveyor 54.

The proportioning of shortening or liquid to sugar or solid material is accurately correlated by the intercontrol between the valves controlling the flow thereof to different rates of flow of the solid material, so that the proportion of solid material and liquid is maintained, insuring at all times the desired proportion of sugar or solid material and shortening or liquid to be mixed with a batch of dry material in the blender.

An advantageous feature of the process is that it enables the impregnating and rubbing or creaming of shortening and sugar to be performed while the sugar and shortening are flowing continuously and in a desired proportion which is predetermined, thus facilitating in a novel manner the blending of dry prepared mixes such as used in bakeries and similar establishments for cake, biscuit, doughnut and waffle formulae and the like, and enabling one single compact unit of machinery to be used to aid in the performance of these operations in their entirety wherever desirable.

I claim:

1. The process of combining finely divided solid material with liquid, comprising flowing a stream of the solid material in the form of a hollow inverted cone toward an apex, and atomizing the liquid above said apex by spraying it in the form of an upright hollow cone within the inverted cone of solid material and thereby confining the atomized liquid within the cone of flowing solid material and impregnating the flowing solid material with the liquid.

2. The process of combining finely divided solid material with liquid, comprising flowing a stream of the solid material in the form of a hollow inverted cone toward an apex, and atomizing the liquid above said apex by spraying it in the form of an upright hollow cone within and coaxially with the inverted cone of solid material and impinging the lower peripheral edge of the hollow cone of liquid against the inner side of the wall of the flowing hollow inverted cone of solid material and thereby commingling the liquid and solid material at the apex of the flowing inverted hollow cone of solid material.

3. The process of impregnating finely divided solid material with liquid, comprising flowing a stream of the solid material continuously in the form of a hollow inverted cone toward an apex, and atomizing the liquid continuously under constant pressure above said apex and directing the atomized liquid downwardly in the form of an upright hollow cone within and coaxially with the flowing hollow inverted cone of solid material and against the inner side of the wall thereof and thereby commingling the liquid and solid material at the apex of the flowing hollow cone of solid material.

4. The process of combining finely divided solid material with liquid, comprising flowing the solid material in the form of a hollow cone, spraying the liquid within and against the inner surface of the cone of solid material to impregnate the latter with liquid, and creaming the resulting mass of liquid impregnated solid material.

5. The process of combining finely divided solid material with liquid, comprising flowing the solid material in the form of a hollow cone, spraying the liquid within and against the inner surface of the cone of flowing solid material to impregnate the latter with liquid, and creaming the resulting mass of liquid-impregnated solid material by flowing the same in a sinuous path and subjecting the mass to frictional rubbing action.

6. The process of combining finely divided solid material with liquid and blending the same with dry material, comprising flowing finely divided solid material in the form of a hollow cone, spraying liquid in the form of a hollow cone against the inner side of the cone of flowing solid material to impregnate the latter with liquid, creaming the liquid-impregnated solid material, and blending the resultant creamed mass with dry material.

7. The process of combining sugar and shortening, comprising flowing sugar in a finely divided state in the form of a hollow inverted cone toward an apex, and atomizing shortening in a liquefied state in the form of a hollow cone within the inverted hollow cone of sugar and above said apex and thereby confining the atomized shortening wholly within the flowing cone of sugar.

8. The process of preparing a mix for bakery products, comprising flowing sugar in a finely divided state and in the form of a hollow cone toward an apex, atomizing shortening in a liquid state and directing it in the form of a hollow cone against the inner side of the flowing hollow cone of sugar and commingling the shortening and sugar at the apex of the flowing cone of sugar, creaming the resulting commingled mass of sugar and shortening, and blending the creamed product with dry ingredients of the desired mix.

ARTHUR TIMOTHY COAKLEY.

References Cited in the file of this patent

UNITED STATES PATENTS

| Number | Name | Date |
|---|---|---|
| 323,681 | Holmes | Aug. 4, 1885 |
| 384,568 | Evans | June 12, 1888 |
| 1,558,069 | Williams | Oct. 20, 1925 |
| 1,788,345 | Skirvin | Jan. 6, 1931 |
| 1,790,347 | Hawkins | Jan. 27, 1931 |
| 1,855,548 | Forster | Apr. 26, 1932 |

FOREIGN PATENTS

| Number | Country | Date |
|---|---|---|
| 57,144 | Denmark | Jan. 15, 1940 |